Jan. 16, 1962   G. LEPINAY ET AL   3,016,641
REAR VIEW MIRROR WITH PARKING-TIME REMINDER
Filed March 17, 1960                                    3 Sheets-Sheet 1

Jan. 16, 1962    G. LEPINAY ET AL    3,016,641
REAR VIEW MIRROR WITH PARKING-TIME REMINDER
Filed March 17, 1960    3 Sheets-Sheet 3

3,016,641
REAR VIEW MIRROR WITH PARKING-TIME
REMINDER
Guy Lepinay, 1 Blvd. de Strasbourg, and Yves Lepinay, 26 Blvd. Gouvion Saint-Cyr, both of Paris, France
Filed Mar. 17, 1960, Ser. No. 15,757
2 Claims. (Cl. 40—70)

This invention relates to rear view mirrors and has specific reference to a rear view mirror constituting at the same time a parking-time indicator intended for use notably in those zones of heavy-traffic towns where parking periods are strictly limited by police regulations.

To this end, the rear view mirror comprises a case, head or the like, adapted to be mounted for example near the top edge of the windshield, and supporting on its inner face two pivot pins on which are rotatably mounted side by side two parking disks having a knurled peripheral edge, the edge of each disk projecting slightly from the case through a pair of slots formed in two opposite lateral edges thereof, these disks carrying on either face inscriptions indicating the successive limit parking times, that is, the time when the parking period begins and the time when this period must end according to police regulations, one disk indicating the a.m. hours and the other the p.m. hours, four windows being formed in the mirror case in front of these disks so that each disk comprises two windows, one for the beginning of the parking period and the other for the limit time or time of departure indicated by the same disk, and a frame in which the mirror glass lens is mounted, this frame being secured on the edge of the case through any adequate means, four windows of smaller dimensions than the case window being formed in the non-silvered portion of the glass along two opposite edges thereof that are parallel to the line of centres of said two disks, two of said last-mentioned windows registering with the peripheral portion of one disk while the other two register with the peripheral portion of the other disk, the inscriptions carried by one and the other faces of said disks being so disposed that they appear horizontally and give the same indications through the windows formed on the one side in said case and on the other side in said glass.

This rear view mirror with parking indicator disks is characterized by the following advantageous features:

The handling (attended by a risk of loss) of a separate parking disk or like instrument is definitely avoided.

The driver is able to see from the interior of the vehicle the times visible from the outside, so that he or she may set the disks without difficulty.

The device is shock-proof due to the conventional mounting of the rear view mirror internally of the vehicle.

If an adequate and known luminescent substance is used for printing the inscriptions on the disks, the parking times will be visible in the dark.

The parking indicator according to this invention may be easily operated by acting with one finger upon that portion of the knurled peripheral portion of the proper disk (according as an a.m. or a p.m. time period is to be selected) which projects from the edge of the device. A simple friction permits the pivoting movements of the disk about its pivot pin.

If desired, a shutter- or stop-like member may be inserted between the bottom of the case and the disks in order to stop those windows of the case that are to remain inoperative, according to the time of the day.

This shutter may consist of a strip, blade or like member adapted to slide to-and-fro in a slideway formed in the case, in front of the windows thereof; this strip is formed with four windows so disposed that when two of them located on one side of the strip are coincident with the two windows of the case that registers with one indicator disk of the device, the other two windows of the strip do not register with the other two windows of the case which are thus stopped.

The shutter may also consist of a pair of stop disks of same dimensions as the indicator disks, which are rotatably mounted on the same pivot pins as these indicator disks and interconnected by a link so as to drive these stop disks simultaneously. Each stop disk has formed therein a pair of windows corresponding to those of said case. The link interconnecting the stop disks is so disposed that the windows are shifted in relation to each other, so that when the windows of one stop disk register with those of the corresponding case windows, the other stop disk closes the other two windows of the case and vice versa.

The stop disks may also consist of disk segments.

Each stop disk is advantageously provided with a lever and each projecting lever end constitutes an actuating handle. These levers and handles are so disposed that they interfere with the free access to the projecting knurled peripheral portion of the indicator disk to be set when the registering stop disk is closed. Thus, any risk of error is safely avoided since the driver cannot set the indicator disk unless the corresponding stop has been opened; now this opening will close automatically the case windows registering with the other indicator disk, due to the specific arrangement of either stop means contemplated herein.

The apparatus according to this invention may be made from any suitable and known material such as wood, metal, plastic, rubber, and according to any suitable and known manufacturing method, for example by molding, pressing, punching, casting or the like.

The glass incorporated in this apparatus, instead of constituting the rear view mirror, may constitute the vanity mirror usually mounted on the sun visor and in this case the apparatus is adapted to be fitted on or in the sun visor. If desired, the glass may be dispensed with and the apparatus mounted at any suitable location in front of the windshield or adjacent to another glass of the vehicle.

Besides, it would not constitute a departure from the basic principles of this invention if cylinders, prisms or indicator tapes were substituted for the indicator disks suggested herein.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which.

Figure 4:
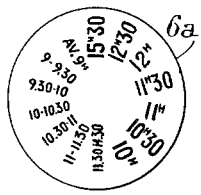
Figure 5:
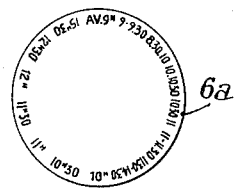
Figure 6:
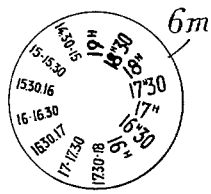
Figure 7:
Figure 8:
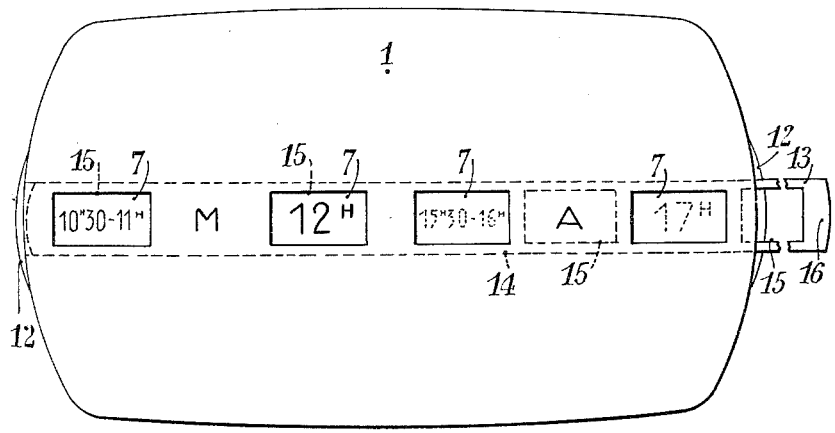
Figure 9:
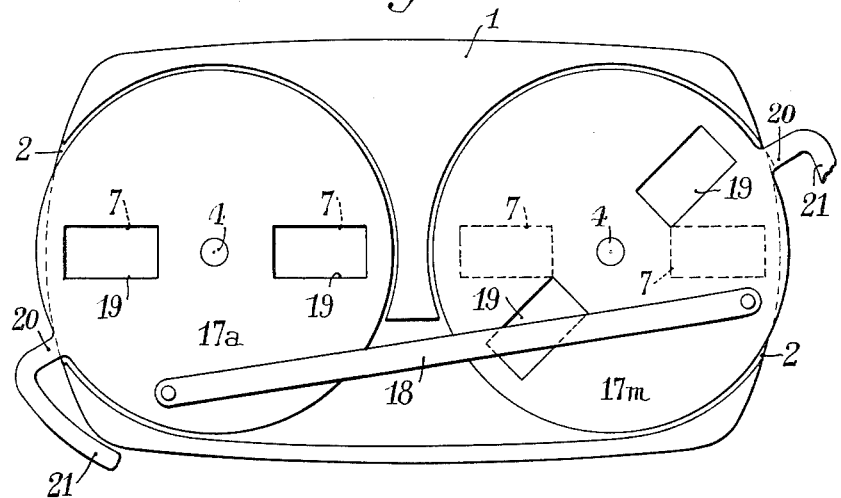
Figure 10:
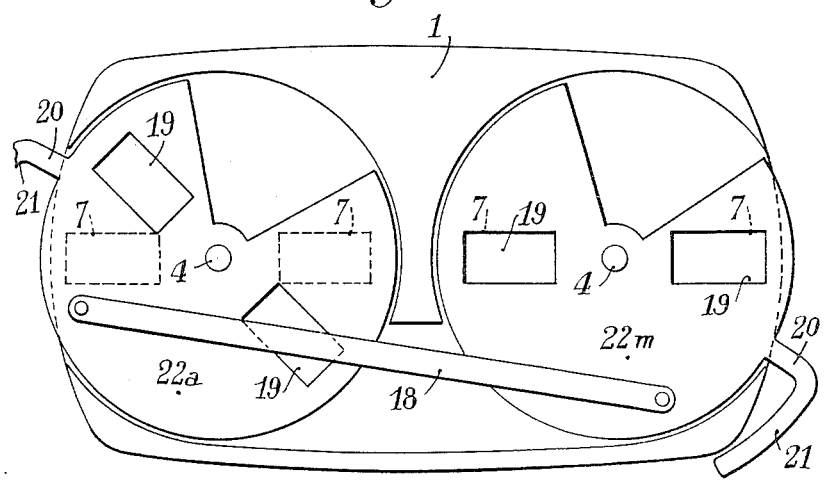

The next figures are taken on a smaller scale:

FIGURE 4 is an elevational view showing the indicator disk for the a.m. times, as seen from the windshield side;

FIGURE 5 is an elevational view of the same disk but taken from the driver's side;

FIGURE 6 is a front elevational view of the indicator disk for the p.m. times as seen from the windshield side;

FIGURE 7 is an elevational view of the same disk, as seen from the driver's side;

FIGURE 8 is a lateral elevational view showing a rear view mirror according to this invention, as seen from the windshield side and provided with a slide-type stop or shutter;

FIGURE 9 is an elevational view showing the case of the rear view mirror of this invention; and FIGURE 10 is a view similar to FIG. 9 but wherein the shutter is of the disk segment type.

Figure 1:
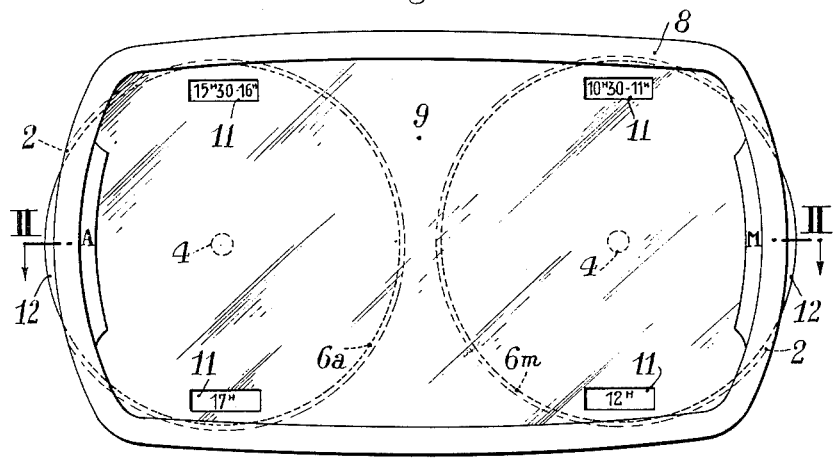
FIGURE 1 is a front elevational view of a rear view mirror constructed according to the teachings of this invention, as seen from the driver's seat.
Figure 2:
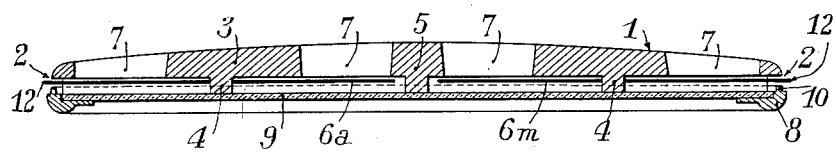
FIGURE 2 is a section taken upon the line 11—11 of FIG. 1.
Figure 3:
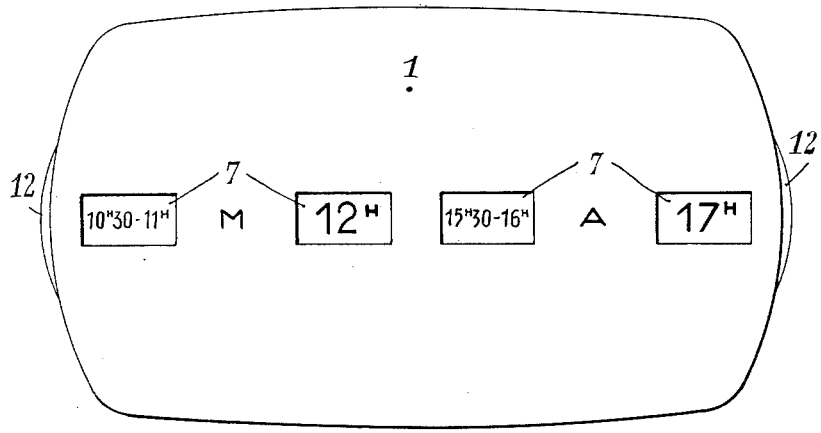
FIGURE 3 is an elevational view of the apparatus but taken from the rear side thereof, that is, from the windshield side.

The rear view mirror illustrated in FIGS. 1 to 3 comprises a case 1 adapted to be mounted with its outer face directed toward the windshield of the vehicle, this case being formed with a pair of recesses 2 in two opposite edges. This case may be made for example from molded plastic and is formed on its inner face with a pair of integral molded portions 3 having two parallel pivot-pin forming extensions 4 disposed at right angles to the bottom of case 1 and symmetrically on the case surface. These pivot pins are level with the aforesaid lateral recesses 2 of the case. Moreover, the inner face of the case may be formed with a separator element 5 also molded integrally therewith and disposed with its mesial transverse axis parallel to the aforesaid portions 3; thus, this element 5 divides the case 1 into two identical recesses.

A pair of rotary parking indicator disks 6m and 6a formed with knurled outer peripheral edges are rotatably mounted on these pivot pins 4, these disks being co-planar in the case 1 and disposed on either side of the separator element 5, and projecting slightly from the lateral recesses 2 of case 1. These disks have inscribed on either face the successive limit times of arrival and departure from a parking place for the morning (FIGS. 4 and 5) and the afternoon (FIGS. 6 and 7), respectively.

Four windows 7 (FIG. 3) are formed in the case 1 in front of the disks 6 so that two windows register with each disk, one for the beginning of the parking period and the other for the end of this period as indicated by the same disk. These windows are aligned with respect to the line of centres of the two disks 6. The outer face of case 1 may carry the inscriptions "A.M." and "P.M." between the two windows, indicating the a.m. and p.m. times. Preferably, the inscriptions carried by the disks are made from luminescent paint or like material so that they can be seen in the dark.

The rear view mirror comprises in addition a frame 8 of same material as the case 1, in which the glass 9 of the rear view mirror is mounted, this frame having its peripheral edge secured through any suitable and known method to the relevant edge of the case 1 in order to close same, except for the region of recesses 2 which must remain open. An assembly by fitting and/or gluing or cementing may be contemplated if the case and the frame are made of plastic material; if metal is used in their manufacture, a crimping, pressing or fitting operation may be preferred, and if they are made from wood, a fitting and/or gluing operation may be used, although the use of nails and screws is not precluded.

In FIG. 2, it appears that the frame 8 is formed on its inner face with a peripheral tenon 10 adapted to fit in a corresponding slot formed along the registering edge of case 1.

Four windows 11 (FIG. 1) are formed in the glass 9; these windows are smaller than the windows 7 of case 1 and positioned along two opposite edges of the glass 9 that are parallel to the line of centres of the two parking disks. Two of these windows register with the periphery of the disk 6m, and the other two register with the periphery of the other disk 6a. The other two edges of the glass may carry inscriptions such as "A.M." and "P.M." respectively, which register with the indicator disks 6m and 6a.

The inscriptions carried by either face of the disks 6 are so disposed that they appear horizontally and identically through the windows 7 of the case on the one hand and the windows 11 of the glass 9 on the other hand, as shown in FIGS. 1 and 3. Consequently, the same time limits are visible simultaneously from the interior and from the exterior of the vehicle. This facilitates for the driver the setting of the parking indicator disks 6. This setting is effected by acting upon the knurled peripheral portion 12 of the proper disk 6a or 6m which projects from the side edge of the apparatus; a simple friction will cause the disk to rotate about its axis 4.

FIG. 8 shows a rear view mirror according to this invention wherein a shutter or stop has been incorporated for stopping or closing the windows 7 of case 1, in the form of a strip or blade 13 of a length greater than that of the case and adapted to slide to-and-fro in a slideway 14 formed in the bottom of case 1, this slideway registering with the case windows 7. The strip 13 is formed in turn with four aligned windows 15 of same dimensions as the windows 7 and so arranged that when two of them, which lie on one-half of the slide strip, are coincident with the two windows 7 of case 1 registering with a parking disk 6 of the apparatus, the other two windows of the slide strip are not coincident with the other two case windows, so that these last-mentioned windows are stopped. In FIG. 8, the stopped windows 7 are those registering with the parking disk 6a which are thus stopped. From this figure it is also apparent that the projecting end 16 of the slide strip 13 which is on the side of the two stopped windows 7 interfere somewhat with the free access to the projecting peripheral knurled edge 12 of the parking disk 6a disposed on the same side. Therefore, this disk 6a cannot be actuated during the afternoon period unless the slide strip 13 has previously been pushed back in order to free the edge 12 of this disk 6a, this movement being attended by the opening of the windows 7 registering with this disk and by the stopping of the windows 7 corresponding to the other parking disk 6m. Therefore with this slide strip arrangement it is not possible to set a disk unless the relevant windows 7 are uncovered beforehand.

FIGURE 9 illustrates another form of embodiment of a shutter or stop consisting of a pair of disks 17a, 17m having the same dimensions as the corresponding parking disks 6a, 6m, these stop-forming disks being rotatably mounted on the same pivot pins 4 in the bottom of the case 1 and directly before the windows 7, and interconnected by means of a link 18. This link permits of simultaneously driving the two disks 17a and 17m. Two windows 19 corresponding to the windows 7 of disk 1 are formed in each stop disk 17 and the link 18 interconnects the disks 17 with an angular shift of the windows 19 such that when one of these disks 17 has its windows registering with the corresponding windows of case 1, the other disk closes the other two windows of the case, and vice versa. In FIG. 9, the windows 7 of the case which register with the indicator disk 6m are stopped.

The stop disks 17 carry on their outer peripheral edges abutments 20 displaceable in the lateral recesses 2 of the case and engaging the ends of these recesses to limit the rotation of the stop-forming disks 17.

The abutments 20 are formed with extensions 21 in the form of levers so directed that they interfere with the free access to the projecting knurled peripheral portion 12 of the parking disk 6 to be set when the registering stop disk 17 is in its stopping position. Thus, in FIG. 9, the stop disk 17m is in its closed position and the driver is prevented from altering the setting of the relevant parking disk 6m, due to the position occupied by the lever 21 of disk 17m; therefore, the driver must open beforehand the stop registering with the disk to be set, prior to this setting operation, so that the possibility of committing an error is definitely precluded.

FIG. 10 illustrates another form of embodiment of the device shown in FIG. 9, wherein the stop disks 17 consist simply of disk segments 22a, 22m of a size sufficient to effect the desired stopping.

Of course, various detail modifications may be brought to the rear view mirrors described hereinabove, notably in connection with the position and shape of the different windows, and, therefore the position of the inscriptions on the parking disks, without however departing from the spirit and scope of the invention.

Furthermore, although the present invention has been described in conjunction with preferred embodiments, it is to be understood that other modifications and variations may be resorted to without departing from the spirit and scope of the invention, as those skilled in the art will readily understand. Such modifications and variations are also considered to be within the purview and scope of the invention and appended claims.

What we claim is:

1. A combination rear view mirror and parking-time indicator for an automotive vehicle, which comprises a case of substantially rectangular configuration, said case being formed with a pair of aligned windows and comprising on its rear face a pair of spaced pivot-forming projections each disposed intermediate the two windows of one of said pairs, a pair of blocking disks each pivotally mounted on one of said case projections, said each blocking disk being formed with a pair of windows adapted, in a given angular position of said blocking disk, to uncover the pair of case windows disposed on either side of said specific case projection, a link mounted behind said pair of blocking disks for operatively interconnecting them with a view, by their movements, to uncover alternately one of said pairs of windows of said case while blocking the other pair, and vice-versa, a pair of control lugs respectively solid with said two blocking disks, said lugs projecting on either side of said case for controlling the simultaneous movement of said two disks, a pair of indicator disks pivotally mounted on said two pivot-forming projections of said case behind said two blocking disks, each indicator disk having on its two front and rear faces a peripheral zone carrying hour data corresponding diametrally by pairs to each other, two corresponding hour data of the front face of said each blocking disk being visible through the pair of case windows disposed on either side of the case projection on which said each indicator disk is pivotally mounted when said pair of case windows is uncovered by the blocking disk pivotally mounted on the same case projection, said each indicator disk comprising furthermore a circular edge projecting slightly from said case for controlling the rotary movements of said indicator disk in said case, the control action on said circular edge being prevented by that one of said two control lugs which project from the same side of said case as said circular edge when said control lug is in the position controlling the blocking of the pair of case windows disposed on either side of the projection on which said each indicator disk is pivotally mounted, a reflecting mirror applied against the rear face of said case on said pivot-forming projections of said rear face of the case, said reflecting mirror being formed with two pairs of windows each adapted to uncover two corresponding hour data of the rear face of one of said two disks, a frame member fitted on said mirror and case so as to assemble said mirror with said case and enclose said pair of blocking disks, said link for operatively interconnecting said pair of blocking disks and the two indicator disks, except said control lugs projecting on either side of said case and said circular control edges which project slightly from either side of said case.

2. A combination rear view mirror and parking-time indicator as set forth in claim 1, in which there is cut out from the inoperative portion of each blocking disk at least one sector for reducing its weight.

References Cited in the file of this patent

UNITED STATES PATENTS

| | | |
|---|---|---|
| 1,651,836 | Rangel | Dec. 6, 1927 |
| 2,492,891 | Schall | Dec. 27, 1949 |
| 2,702,954 | Cline et al. | Mar. 1, 1955 |